(12) United States Patent
Nakayama et al.

(10) Patent No.: US 8,349,447 B2
(45) Date of Patent: Jan. 8, 2013

(54) ANTIFOULING COMPOSITE MATERIAL

(75) Inventors: Tsuruo Nakayama, Tokyo (JP); Youhei Jikjhara, Tokyo (JP); Yasuyoshi Watanabe, Tokyo (JP); Nobukazu Motojima, Tokyo (JP)

(73) Assignee: NBC Meshtec, Inc., Tokyo (JP)

( * ) Notice: Subject to any disclaimer, the term of this patent is extended or adjusted under 35 U.S.C. 154(b) by 825 days.

(21) Appl. No.: 12/084,986

(22) PCT Filed: Dec. 28, 2006

(86) PCT No.: PCT/JP2006/326224
§ 371 (c)(1),
(2), (4) Date: May 14, 2008

(87) PCT Pub. No.: WO2007/080804
PCT Pub. Date: Jul. 19, 2007

(65) Prior Publication Data
US 2009/0094954 A1 Apr. 16, 2009

(30) Foreign Application Priority Data
Jan. 13, 2006 (JP) .................................. 2006-006759

(51) Int. Cl.
*B32B 5/16* (2006.01)

(52) U.S. Cl. .......... 428/331; 428/327; 428/447; 442/81; 442/94

(58) Field of Classification Search ........................ None
See application file for complete search history.

(56) References Cited

U.S. PATENT DOCUMENTS

| 5,922,787 A * | 7/1999 | Kondo et al. ................. 523/122 |
| 6,673,433 B1 * | 1/2004 | Saeki et al. .................... 428/323 |
| 6,720,072 B1 * | 4/2004 | Hinterwaldner et al. ..... 428/403 |
| 6,830,816 B2 * | 12/2004 | Mehnert et al. ............ 428/423.1 |
| 2004/0026832 A1 | 2/2004 | Gier et al. |
| 2004/0067339 A1 * | 4/2004 | Gandon et al. ................ 428/141 |
| 2005/0227092 A1 * | 10/2005 | Yamaya et al. ............... 428/447 |
| 2005/0282702 A1 * | 12/2005 | Murasawa et al. ............ 502/308 |
| 2006/0177671 A1 | 8/2006 | Nakayama et al. |
| 2006/0266258 A1 | 11/2006 | Asakura et al. |

FOREIGN PATENT DOCUMENTS

| EP | 1 602 407 | 12/2005 |
| JP | 8-74171 | 3/1996 |

(Continued)

OTHER PUBLICATIONS

International Search Report issued Apr. 24, 2007 in the International (PCT) Application PCT/JP2006/326224 of which the present application is the U.S. National Stage.

Form PCT/IB/338 dated Jul. 24, 2008 together with International Preliminary Report on Patentability including English translation of PCT Written Opinion in the International (PCT) Application PCT/JP2006/326224 of which the present application is the U.S. National Stage.

(Continued)

*Primary Examiner* — Jennifer McNeil
*Assistant Examiner* — Scott R Walshon
(74) *Attorney, Agent, or Firm* — Wenderoth, Lind & Ponack, L.L.P.

(57) ABSTRACT

An inorganic fine particle layer containing inorganic fine particles and a binder component is formed on a surface of a substrate by chemical bonding. The inorganic fine particles are coated with silane monomer each having an unsaturated bond. The content of the binder component is in the range of 0.1% by mass to 40% by mass to the content of the inorganic fine particles.

15 Claims, 5 Drawing Sheets

FOREIGN PATENT DOCUMENTS

| | | | | |
|---|---|---|---|---|
| JP | 10-1879 | | | 1/1998 |
| JP | 2000-17230 | | | 1/2000 |
| JP | 2000017230 | A | * | 1/2000 |
| JP | 2005-113110 | | | 4/2005 |
| JP | 2005-194652 | | | 7/2005 |
| JP | 2005-261997 | | | 9/2005 |
| JP | 2005-264347 | | | 9/2005 |
| JP | 2005261997 | A | * | 9/2005 |
| JP | 2005-325459 | | | 11/2005 |
| WO | 03/087236 | | | 10/2003 |
| WO | 2004/078347 | | | 9/2004 |
| WO | 2005/028579 | | | 3/2005 |

OTHER PUBLICATIONS

English abstract of JP 2004-270039 published Sep. 30, 2004.
English abstract of JP 2005-163236 published Jun. 23, 2005.
English abstract of JP 2004-003046 published Jan. 8, 2004.
English abstract of JP 09-241622 published Sep. 16, 1997.
English abstract of JP 11-092714 published Apr. 6, 1999.
English abstract of JP 2003-096311 published Apr. 3, 2003.
Supplementary European Search Report dated Mar. 12, 2012 in corresponding European Application No. 06 84 3602.

* cited by examiner

ANTIFOULING COMPOSITE MATERIAL

TECHNICAL FIELD

The present invention relates to an antifouling composite material on which suspended particulate matter composed of fine particles, such as soil dust, sand dust, or pollen, or a liquid substance, such as soy sauce, coffee, or juice, hardly deposits or from which suspended particulate matter or a liquid substance is easily removable even when the suspended particulate matter or the liquid substance deposits thereon.

BACKGROUND ART

In recent years, allergic diseases caused by suspended matter, such as cedar pollen, dead mites, fungal spores, or house dust, have become a major social problem. The suspended particulate matter deposits easily on clothes or air conditioner filters. Thus, the suspended particulate matter deposited on the clothes and the filters may, in turn, detach therefrom and pollute an indoor environment. Furthermore, the suspended particulate matter decreases the sucking force or the ventilation capacity of filters in cleaners or ventilating fans.

The suspended particulate matter tends to deposit on fibrous structures having a complicated structure of rough surface and voids. Furthermore, because cedar pollen has projections, cedar pollen deposits easily on fibrous structures. Thus, cedar pollen can easily enter a house. Filters of air conditioners and their cases, ventilating fans, or cleaners composed of molded-plastic members become charged by friction. Thus, the suspended particulate matter is well known to deposit on them and become a major cause of contamination and deterioration in product functions.

Furthermore, the deposition of a liquid substance, such as soy sauce, coffee, or juice, to clothes, wallpapers, or carpets may cause stains or generate molds, which may in turn generate fungal spores. In addition, after the liquid substance dries, components contained in the liquid substance may be suspended in the air, thereby polluting an indoor environment.

As an antifouling (hereinafter also referred to as dustproof) technique for preventing the deposition of "solid dirt," such as motes or dust, fibers on which cedar pollen hardly deposits or treatments that prevent the deposition of cedar pollen have recently been proposed. Examples of the fibers include textiles treated with a processing agent that contains a nonionic antistatic agent, silica sol containing colloidal silica modified with aluminosilicate, and an aqueous polyethylene emulsion (see, for example, Patent Document 1); cellulose-based fibers on which alumina fine particles having a size of 1.0 µm or less are deposited or cellulose-based fibers impregnated with the alumina fine particles (see, for example, Patent Document 2); and fibrous structures treated with colloidal silica and a processing liquid containing a glyoxal-based resin or a silicone resin compound (see, for example, Patent Document 3).

Treatment of clothes, wallpapers, or carpets with water-repellents is generally performed as an antifouling technique for preventing the deposition of "liquid stain" such as "soy sauce, coffee, juice, oil, dirty water, or blood" as well as "solid dirt" such as motes or dust. Examples of the water-repellents include aqueous solutions that contain an acrylate or a methacrylate each having a fluoroalkyl group and an alkoxysilane coupling agent (see, for example, Patent Document 4); processing liquids that contain an alkoxysilane and an alkyl-modified silicone oil dispersed in an organic solvent (see, for example, Patent Document 5); and compositions that include a phosphorus acid compound having a perfluoroalkyl group and a thermoplastic resin or a thermosetting resin (see, for example, Patent Document 6). These compositions are applied to the surface of fibers, such as clothing or carpets, to provide antifouling characteristics.

[Patent Document 1] Japanese Unexamined Patent Application Publication No. 2004-270039
[Patent Document 2] Japanese Unexamined Patent Application Publication No. 2005-163236
[Patent Document 3] Japanese Unexamined Patent Application Publication No. 2004-003046
[Patent Document 4] Japanese Unexamined Patent Application Publication No. 9-241622
[Patent Document 5] Japanese Unexamined Patent Application Publication No. 11-092714
[Patent Document 6] Japanese Unexamined Patent Application Publication No. 2003-096311

DISCLOSURE OF INVENTION

Problems to be Solved by the Invention

However, the textiles and the fibrous structures described above have the following problems.

For example, in textiles described in Patent Document 1, an antideposition function is imparted by a nonionic antistatic agent, that is, a detergent. The detergent may be washed away by washing or rain. The antideposition effect on pollen is difficult to maintain for a long period of time. Furthermore, in fiber products described in Patent Document 2, alumina fine particles are immobilized on cellulose-based fibers. This disadvantageously limits the type of fiber material. In fibrous structures described in Patent Document 3, colloidal silica is immobilized on the fibers with a glyoxal-based resin binder. The fibrous structures may become charged easily because of some component in the resin binder. Suspended particulate matter can therefore easily deposit on the fibrous structures, and the deposited suspended particulate matter is difficult to remove.

In Patent Documents 4 and 5, because a water-repellent compound is washed away by washing or rain, the antifouling property is difficult to maintain for a long period of time. In Patent Document 6, a binder of a thermoplastic resin or a thermosetting resin becomes charged easily. Hence, while the antifouling effect is achieved, the dustproof effect is not observed. Furthermore, deposited suspended particulate matter is difficult to remove.

To solve these known problems, the present inventors perfected the present invention by discovering that silane monomer-coated inorganic fine particles immobilized on a substrate to prevent triboelectrification can provide an excellent antifouling composite material. The inorganic fine particles can prevent the deposition of suspended particulate matter or liquid substances. Even when suspended particulate matter or liquid substances deposit on the composite material, the suspended particulate matter or the liquid substances can easily be removed.

Means for Solving the Problems

A first aspect of the present invention provides an antifouling composite material that includes a substrate and an inorganic fine particle layer disposed on a surface of the substrate, the inorganic fine particle layer including inorganic fine particles and a binder component, the inorganic fine particles being coated with silane monomer each having an unsaturated bond, wherein the content of the binder component in the inorganic fine particle layer is in the range of 0.1% by mass to 40% by mass to the content of the inorganic fine particles. According to the present invention, a binder component enters gaps between the silane monomer-coated inorganic fine particles and combines silane monomer that do not participate in the bonding between the fine particles. This increases the strength of the bonding between the fine particles, thus providing an antifouling composite material having high strength and of much practical use.

In the antifouling composite material according to the first aspect of the present invention, the binder component may contain a water-repellent substance or an oil-repellent substance. According to the present invention, the water-repellent substance or the oil-repellent substance is oriented in gaps between the silane monomer-coated inorganic fine particles and on the surface of the inorganic fine particle layer at any intervals, thus efficiently exhibiting water repellency or oil repellency at low concentration. The presence of a very small volume of space through which electrons can pass makes triboelectrification difficult, thus preventing the deposition of suspended particulate matter, such as soil dust or pollen, or a liquid substance, such as soy sauce, coffee, or juice.

Furthermore, in the antifouling composite material according to the first aspect of the present invention, the binder component may contain a fluorinated compound. According to the present invention, the binder component composed of the fluorinated compound is regularly oriented on the surface of the fine particles at any intervals, thus efficiently exhibiting water repellency or oil repellency at low concentration. The presence of a very small volume of space through which electrons can pass makes triboelectrification difficult, thus preventing the deposition of suspended particulate matter, such as soil dust or pollen, or a liquid substance, such as soy sauce, coffee, or juice.

Furthermore, in the antifouling composite material according to the first aspect of the present invention, the unsaturated bonds of the silane monomer disposed on the inorganic fine particles in the inorganic fine particle layer may form chemical bonds, thereby forming the inorganic fine particle layer, and the unsaturated bonds of the silane monomer disposed on the inorganic fine particles in the inorganic fine particle layer may be bound to the surface of the substrate through the chemical bonds, thereby fixing the inorganic fine particle layer onto the substrate.

In the antifouling composite material according to the fourth aspect of the present invention, the chemical bonds may be formed by graft polymerization.

In the antifouling composite material according to the fifth aspect of the present invention, the graft polymerization may be radiation graft polymerization.

In the antifouling composite material according to the first aspect of the present invention, at least the surface of the substrate may be formed of a resin.

In the antifouling composite material according to the first aspect of the present invention, the substrate may be formed of a resin.

In the antifouling composite material according to the first aspect of the present invention, the substrate may have a fibrous structure.

The present invention also provides clothing formed of an antifouling composite material according to the eighth aspect of the present invention.

The present invention also provides a filter formed of an antifouling composite material according to the eighth aspect of the present invention.

The present invention also provides a mosquito net formed of an antifouling composite material according to the eighth aspect of the present invention.

The present invention also provides a building material formed of an antifouling composite material according to the seventh aspect of the present invention.

The present invention also provides an interior material formed of an antifouling composite material according to the eighth aspect of the present invention.

| Reference Numerals | |
|---|---|
| 100 | antifouling composite material |
| 1 | substrate |
| 2 | inorganic fine particle |
| 3 | silane monomer |
| 4 | binder component |
| 5 | chemical bond |
| 10 | inorganic fine particle layer |

BEST MODE FOR CARRYING OUT THE INVENTION

An antifouling composite material according to an embodiment of the present invention will now be described in detail.

Figure 1:
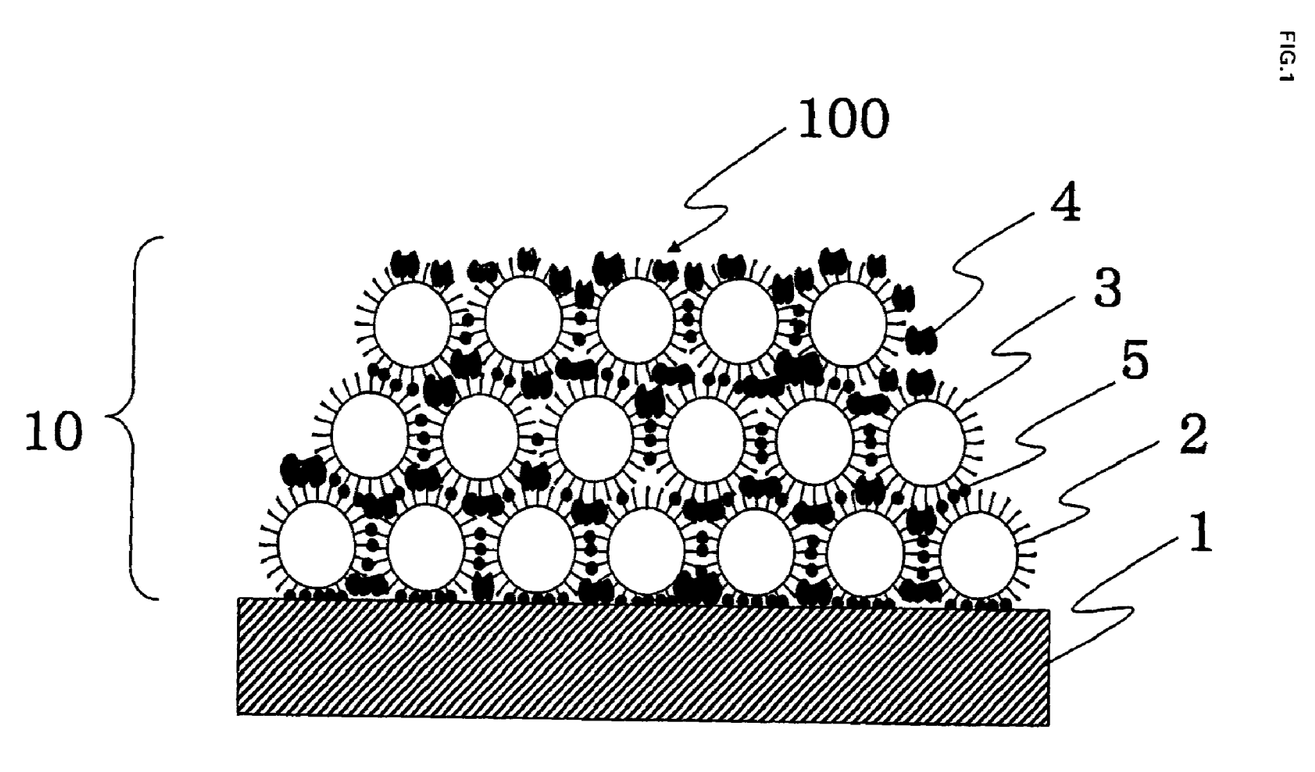
FIG. 1 is a fragmentary enlarged schematic view of an antifouling composite material according to an embodiment of the present invention.

FIG. 1 is a fragmentary enlarged cross-sectional view of an antifouling composite material 100 according to an embodiment of the present invention. The antifouling composite material 100 according to the present embodiment consists of an inorganic fine particle layer 10 fixed on a substrate 1. The inorganic fine particle layer 10 includes inorganic fine particles 2 and a binder component 4.

In FIG. 1, for the purpose of clarifying an embodiment of the present invention, while the inorganic fine particle layer 10 contains one type of fine particles, the inorganic fine particle layer 10 may contain two or more types of fine particles. Furthermore, the inorganic fine particle layer 10 may include a fine particle monolayer or a fine particle multilayer.

The surface of the inorganic fine particles 2 according to the present embodiment is bound to outwardly oriented silane monomer 3 having an unsaturated bond. The unsaturated bonds face outward from the surface of the inorganic fine particles 2. The surface of the inorganic fine particles 2 is coated by the silane monomer 3. A hydrophilic silanol terminal group of the silane monomer 3 at the one end is attracted to the hydrophilic surface of the inorganic fine particles 2. A hydrophobic unsaturated bond of the silane monomer 3 at the other end is located away from the surface of the inorganic fine particles 2. The silanol group of the silane monomer 3 is bound to the surface of the inorganic fine particles 2 by dehydration condensation. Thus, the silane monomer 3 is oriented with the unsaturated bond facing outward.

For example, in a specific treatment, the silane monomer 3 is added to a solution containing the inorganic fine particles 2 dispersed in an organic solvent and is pulverized into fine particles. The dispersion solution is subjected to solid-liquid separation to collect the inorganic fine particles 2. The inorganic fine particles 2 are heated at a temperature in the range of 100° C. to 180° C. to combine the silane monomer 3 with the inorganic fine particles 2. Alternatively, for example, the silane monomer 3 is added to a solution containing the inorganic fine particles 2 dispersed in an organic solvent, and are pulverized into fine particles. The dispersion solution is then transferred into a flask equipped with a condenser tube and is heated in an oil bath to combine the silane monomer 3 to the surface of the inorganic fine particles 2.

The amount of silane monomer 3 introduced onto the surface of the inorganic fine particles 2 by condensation reaction may be such that the silane monomer 3 covers 0.5% to 100% of the surface of the inorganic fine particles 2.

The diameters of the inorganic fine particles and other fine particles in the materials described above are not limited, provided that these fine particles are formed by a method according to the present embodiment. However, the average particle size of the inorganic fine particles is preferably 300 nm or less to appropriately perform graft polymerization described below. Furthermore, stronger bonding between the inorganic fine particles and the substrate 1 can be achieved at an average particle size of 100 nm or less. Hence, this range is more preferred in terms of durability.

The material of the substrate 1 for use in the antifouling composite material 100 according to the present embodiment may be any material that can form chemical bonds 5 with the silane monomer 3 having an unsaturated bond. Examples of such a material include resins, synthetic fibers, and natural fibers. At least a surface of the substrate 1 for use in the antifouling composite material 100 according to the present embodiment is formed of a resin.

The surface of the substrate 1 or the entire substrate 1 may be formed of a synthetic resin or a natural resin. Examples of the synthetic resin and the natural resin include thermoplastic resins, such as polyethylene resins, polypropylene resins, polystyrene resins, ABS resins, AS resins, EVA resins, polymethylpentene resins, polyvinyl chloride resins, polyvinylidene chloride resins, polymethyl acrylate resins, polyvinyl acetate resins, polyamide resins, polyimide resins, polycarbonate resins, polyethylene terephthalate resins, polybutylene terephthalate resins, polyacetal resins, polyacrylate resins, polysulfone resins, polyvinylidene fluoride resins, VECTRAN (registered trademark for a high-strength polyarylate fiber), and PTFE; biodegradable resins, such as polylactic acid resins, polyhydroxybutyrate resins, modified starch resins, polycaprolactone resins, polybutylene succinate resins, polybutylene adipate terephthalate resins, polybutylene succinate terephthalate resins, and polyethylene succinate resins; thermosetting resins, such as phenolic resins, urea resins, melamine resins, unsaturated polyester resins, diallyl phthalate resins, epoxy resins, epoxy acrylate resins, silicon resins, acrylic polyurethane resins, and urethane resins; elastomers, such as silicone resins, polystyrene elastomers, polyethylene elastomers, polypropylene elastomers, and polyurethane elastomers; and natural resins such as Japanese lacquer.

The resin forming the substrate 1 according to the present embodiment may have various shapes and sizes depending on the purpose of the usage and may be, but not limited to, a plate, a film, a fibrous structure formed of a fibrous material, including fabric, knit fabric, or nonwoven fabric, a roll, a web, or a honeycomb.

When the major portion of the substrate 1 is formed of a metallic material, such as aluminum, magnesium, or iron, or an inorganic material, such as glass or ceramic, the resin forming the substrate 1 may be layered on the metallic material or the inorganic material. The resin forming the substrate 1 may be formed as a thin film on the metallic material or the inorganic material by coating, such as spray coating, dip coating, or electrostatic coating, or printing, such as screen printing or offset printing.

Furthermore, the resin forming the substrate 1 may be colored with a pigment or a dye. The resin forming the substrate 1 may contain an inorganic material, such as silica, alumina, diatomaceous earth, or mica.

The substrate 1 may be formed of synthetic resin fiber (synthetic fiber or chemical fiber). Examples of the synthetic fiber forming the substrate 1 include polyester fiber, polyamide fiber, polyvinyl alcohol fiber, acrylic fiber, polyvinyl chloride fiber, polyvinylidene chloride fiber, polyolefin fiber, polycarbonate fiber, fluorocarbon fiber, polyurea fiber, elastomer fiber, Vecry (registered trademark), and composite fiber of a material constituting these fibers and the resin material described above.

As described above, since at least a surface of the substrate 1 according to the present embodiment is formed of a resin, when the material of the substrate 1 is fiber other than synthetic resins, the fiber may be coated with the resin by a coating method described above to form a thin film of the resin on the fiber. Thus, the material of the substrate 1 may be formed of natural fiber, such as cotton, hemp, or silk, or a Japanese paper made from natural fiber.

The inorganic fine particles 2 for use in the antifouling composite material 100 according to the present embodiment may be composed of a nonmetal oxide, a metal oxide, or a complex metal oxide. The inorganic fine particles 2 may be crystal or amorphous. Examples of the nonmetal oxide include silicon oxide. Examples of the metal oxide include magnesium oxide, barium oxide, barium peroxide, aluminum oxide, tin oxide, titanium oxide, zinc oxide, titanium peroxide, zirconium oxide, iron oxide, iron hydroxide, tungsten oxide, bismuth oxide, and indium oxide. Examples of the complex metal oxide include barium titanium oxide, cobalt aluminum oxide, lead zirconate, lead niobate, $TiO_2$—$WO_3$, $AlO_3$—$SiO_2$, $WO_3$—$ZrO_2$, and $WO_3$—$SnO_2$.

The surface of the inorganic fine particles 2 may have catalyst fine particles of a noble metal, such as Au, Pt, Pd, Rh, and/or Ru, or catalyst fine particles of oxide fine particles composed of Ni, Co, Mo, W, Mn, Cu, V, and/or Se.

A fine particle layer formed of one type of inorganic fine particles 2 may be overlaid with another fine particle layer formed of one or more types of inorganic fine particles. The inorganic fine particles 2 may form a fine particle layer in combination with a photocatalytic material, an antimicrobial material, a negative ion-releasing material, a material emitting far-infrared rays, an antireflective material, or a material absorbing near-infrared rays.

When photocatalyst fine particles are used as the inorganic fine particles 2 or when the fine particle layer contains photocatalyst fine particles, the hydrophilicity of the photocatalyst fine particles provides another effect of allowing deposited contaminants to be washed away easily, and photolysis of an organic substance by the photocatalyst fine particles provides still another effect of decomposing and eliminating deposited contaminants. Excellent dustproof and antifouling effects can therefore be achieved on not only suspended particulate matter, but also liquid, tarry, misty, fumy, or gaseous pollutants or adsorption substances.

The term "photocatalyst particle" used herein means a particle that exhibits a photocatalytic function when irradiated with light having a wavelength corresponding to the energy of at least its band gap. The photocatalyst particle may be composed of a known metallic compound semiconductor, such as titanium oxide, zinc oxide, tungsten oxide, iron oxide, strontium titanate, cadmium sulfide, or cadmium selenide, alone or in combination. Preferably, the photocatalyst particle is composed of titanium oxide because of its high transparency, high durability, and harmlessness.

The crystal structure of titanium oxide may be rutile, anatase, brookite, or even amorphous. The photocatalyst particle may be composed of $TiO_2$-$N_x$, in which part of oxygen atoms of titanium oxide is replaced with anionic nitrogen atoms, or $TiO_2$-x, which lacks an oxygen atom and is significantly out of the stoichiometric ratio (X is 1.0 or less).

The photocatalyst particle may contain a metal, such as vanadium, copper, nickel, cobalt, chromium, palladium, silver, platinum, or gold, or a metallic compound therein or thereon to enhance the photocatalytic function.

Antimicrobial inorganic fine particles 2 can reduce contaminants particularly resulting from the propagation of mold, bacteria, or microorganisms. Typical examples of inorganic antimicrobial material include silver, copper, zinc, tin, lead, and compounds thereof. In particular, at least one antimicrobial material selected from the group consisting of silver, copper, zinc, and compounds thereof is utilized in various applications because of its antimicrobial properties or no harmful effect on human body.

These metals and compounds thereof may be used alone. However, because some of them change color or cause discoloration of antimicrobial products, they are used in a supported form in which they are loaded on fine particles of an inorganic material. Examples of the inorganic material include zeolite, such as high-silica zeolite, sodalite, mordenite, analcite, and erinite, and apatite such as hydroxyapatite. These inorganic materials have ion exchange properties. Other typical examples of the inorganic material include titanium dioxide, silicon dioxide, alumina oxide, magnesium oxide, calcium oxide, calcium carbonate, barium sulfate, zirconium oxide, barium titanate, and zirconium phosphate.

Commercially available antimicrobial fine particles, for example, "Novaron" from Toagosei Co., Ltd., "Zeomic" from Sinanen Zeomic Co., Ltd., "Apatizer A" from Sangi Co., Ltd., "Daikiller" from Dainichiseika Color & Chemicals Mfg. Co., Ltd., "Amenitop" from Matsushita Electric Industrial Co., Ltd., "Atomy Ball" from Catalysts & Chemicals Industries Co., Ltd., and "Bactekiller" from Kanebo Chemical Industries LTD., may be used alone or in combination.

In the antifouling composite material according to the present embodiment, the inorganic fine particle layer 10 containing the inorganic fine particles 2 is fixed on the substrate 1 with the silane monomer 3 having an unsaturated bond through the chemical bonds 5 (filled circles in FIG. 1).

Specific examples of the unsaturated bond of the silane monomer 3 include a vinyl group, an epoxy group, a styryl group, a methacryl group, an acryloxy group, and an isocyanate group.

In the antifouling composite material according to the present embodiment, the reactive silane monomer 3 combines the inorganic fine particles 2 together through chemical bonds generated by the dehydration condensation reaction of silanol groups of the silane monomer 3, and also combines the inorganic fine particles 2 with the substrate 1 through the chemical bonds 5 generated by the graft polymerization of the functional group of the silane monomer 3 to the resin surface of the substrate 1, as described below.

Examples of the silane monomer 3 for use in an antifouling composite material 100 according to the present embodiment include vinyltrimethoxysilane, vinyltriethoxysilane, vinyltriacetoxysilane, N-β-(N-vinylbenzylaminoethyl)-γ-aminopropyltrimethoxysilane, N-(vinylbenzyl)-2-aminoethyl-3-aminopropyltrimethoxysilane hydrochloride, 2-(3, 4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and 3-isocyanatepropyltriethoxysilane.

These silane monomers 3 may be used alone or in combination. The silane monomer 3 is used as a solution containing a required amount of silane monomer 3 in an organic solvent, such as methanol, ethanol, acetone, toluene, or xylene. A mineral acid, such as hydrochloric acid or nitric acid, may be added to the solution to improve the dispersibility.

Examples of the solvent include lower alcohols, such as ethanol, methanol, propanol, and butanol; lower alkyl carboxylic acids, such as formic acid and propionic acid; aromatic compounds, such as toluene and xylene; esters, such as ethyl acetate and butyl acetate; and cellosolves, such as methyl cellosolve and ethyl cellosolve. These solvents may be used alone or in combination.

The inorganic fine particles 2 for use in the antifouling composite material 100 according to the present embodiment are used for manufacture as a dispersion in the solution of the silane monomer 3. The inorganic fine particles 2 may be dispersed by agitation using a homomixer or a magnetic stirrer, by pulverization using a ball mill, a sand mill, a tumbling mill, or a jet mill, or by using an ultrasonic wave.

In the production of the antifouling composite material 100, the inorganic fine particles 2 may be used as a colloidal dispersion or as a dispersion liquid prepared by pulverizing the inorganic fine particles 2 into fine particles. The dispersion liquid of the inorganic fine particles 2 may be used as follows: the silane monomer 3 is added to a colloidal dispersion or to a dispersion liquid prepared by pulverization, and is heated under reflux to combine the silane monomer 3 with the inorganic fine particles 2 by a dehydration condensation reaction, thus coating the inorganic fine particles 2 with the silane monomer 3. Alternatively, after the silane monomer 3 is added to a dispersion liquid prepared by pulverizing the inorganic fine particles 2 into fine particles, or after the silane monomer 3 is added to a dispersion liquid and is pulverized into fine particles, the dispersion solution is subjected to solid-liquid separation, is heated at a temperature in the range of 100° C. to 180° C. to combine the silane monomer 3 with the inorganic fine particles 2 by a dehydration condensation reaction, and is redispersed by pulverization.

In a case where after the silane monomer 3 is added to a dispersion liquid prepared by pulverizing the inorganic fine particles 2 into fine particles, or after the silane monomer 3 is added to a dispersion liquid and is pulverized into fine particles, the dispersion solution is subjected to solid-liquid separation, is heated at a temperature in the range of 100° C. to 180° C. to chemically combine the silane monomer 3 with the inorganic fine particles 2, when the coverage of the surface of the inorganic fine particles 2 with the silane monomer is in the range of 0.5% to 100%, the bond strength between the inorganic fine particles 2 and the substrate 1 having a resin surface is sufficient for practical applications.

When the inorganic fine particle layer 10 including the inorganic fine particles 2 has an increased thickness, the inorganic fine particle layer 10 may become deteriorated by cohesive failure depending on the stress of the inorganic fine particle layer 10 and the operating environment. Thus, after the inorganic fine particles 2 are coated with the silane monomer 3, the addition of the binder component 4 follows. The binder component 4 combines the inorganic fine particles 2 coated with the silane monomer 3 together and also combines the inorganic fine particles 2 with the substrate 1, thus preventing the detachment of the inorganic fine particle layer 10 caused by deterioration including cohesive failure. The binder component 4 preferably has an unsaturated group, such as a vinyl group, an epoxy group, a styryl group, a methacryl group, an acryloxy group, or an isocyanate group, or an alkoxy group as a reactive site that can be chemically bound to the reactive group of the silane monomer 3 disposed on the inorganic fine particles 2.

Specific examples of the binder component 4 include monofunctional, bifunctional, and polyfunctional vinyl monomers having an unsaturated bond, such as acrylic acid, methylmethyl methacrylate, ethyl acrylate, n-butyl acrylate, 2-hydroxyethyl acrylate, methyl methacrylate, 2-hydroxyethyl acrylate, acrylamide, methacrylamide, acrylonitrile, vinyl acetate, styrene, itaconic acid, trimethylolpropane triacrylate, and pentaerythritol triacrylate.

Further examples of the binder component 4 include silane monomers having an unsaturated bond, such as vinyltrimethoxysilane, vinyltriethoxysilane, vinyltriacetoxysilane, and N-β-(N-vinylbenzylaminoethyl)-γ-aminopropyltrimethoxysilane.

Still further examples of the binder component 4 include alkoxysilane compounds represented by $Si(OR_1)_4$ (wherein R1 denotes an alkyl group having one to four carbon atoms), such as tetramethoxysilane and tetraethoxysilane, and alkoxysilane compounds represented by $R_{2n}Si(OR_3)_{4-n}$ (wherein $R_2$ denotes a hydrocarbon group having one to six carbon atoms, $R_3$ denotes an alkyl group having one to four carbon atoms, and n is an integer of 1, 2, or 3), such as methyltolylmethoxysilane, methyltriethoxysilane, dimethyldiethoxysilane, phenyltriethoxysilane, hexamethyldisilazane, and hexyltrimethoxysilane.

Still further examples of the binder component 4 include water-repellent substances and oil-repellent substances, such as stearic acid acrylate and reactive silicone oils.

Still further examples of the binder component 4 include water-repellent substances and oil-repellent substances, such as reactive silicone oligomers, for example, Brucella D from Matsushita Electric Industrial Co., Ltd.

Still further examples of the binder component 4 include water-repellent substances and oil-repellent substances, such as acryl monomers having a perfluoroalkyl group, for example, 2-(perfluoropropyl)ethyl acrylate, 2-(perfluorobutyl)ethyl acrylate, 2-(perfluoropentyl)ethyl acrylate, 2-(perfluorohexyl)ethyl acrylate, 2-(perfluoroheptyl)ethyl acrylate, 2-(perfluorooctyl)ethyl acrylate, 2-(perfluorononyl)ethyl acrylate, 2-(perfluorodecyl)ethyl acrylate, 3-perfluorohexyl-2-hydroxypropyl acrylate, perfluorooctylethyl methacrylate, 3-perfluorooctyl-2-hydroxypropyl acrylate, and 3-perfluorodecyl-2-hydroxypropyl acrylate.

Still further examples of the binder component 4 include water-repellent substances and oil-repellent substances, such as other fluorine compounds, for example, 2-perfluorooctyl ethanol, 2-perfluorodecyl ethanol, 2-perfluoroalkyl ethanol, perfluoro(propyl vinyl ether), perfluoroalkyl iodide, perfluorooctyl ethylene, and 2-perfluorooctyl ethyl phosphonic acid.

Still further examples of the binder component 4 include water-repellent substances and oil-repellent substances, such as silane coupling agents having a perfluoroalkyl group, for example, $CF_3(CH_2)_2Si(OCH_3)_3$, $CF_3(CF_2)_5(CH_2)_2Si(OCH_3)_3$, $CF_3(CF_2)_7(CH_2)_2Si(OCH_3)_3$, $CF_3(CF_2)_{11}(CH_2)_2Si(OCH_3)_3$, $CF_3(CF_2)_{15}(CH_2)_2Si(OCH_3)_3$, $CF_3(CF_2)_7(CH_2)_2Si(OC_2H_5)_3$, $CF_3(CH_2)_2SiCH_3(OCH_3)_2$, $CF_3(CF_2)_2(CH_2)_2SiCH_3(OCH_3)_2$, $CF_3(CF_2)_5(CH_2)_2SiCH_3(OCH_3)_2$, $CF_3(CF_2)_7(CH_2)_2SiCH_3(OCH_3)_2$, $CF_3(CF_2)_7(CH_2)_2SiCH_3(OC_2H_5)_2$, $CF_3(CF_2)_7(CH_2)_2Si(OCH_3)_3$, $CF_3(CF_2)_7(CH_2)_2Si(OC_2H_5)_3$, $CH_3(CF_2)_9(CH_2)_8Si(OC_2H_5)_3$, $CF_3(CF_2)_7CONH(CH_2)_3Si(OCH_3)_3$, and $CF_3(CF_2)_7CONH(CH_2)_2SiCH_3(OCH_3)_2$, and oligomers having a perfluoroalkyl group and a silanol group, for example, KP-801M (Shin-Etsu Chemical Co., Ltd.) and X-24-7890 (Shin-Etsu Chemical Co., Ltd.).

Still further examples of the binder component 4 include unsaturated polyesters, unsaturated acryls, epoxy acrylates, urethane acrylates, polyester acrylates, polyether acrylates, polybutadiene acrylates, silicone acrylates, maleimide, oligomers and prepolymers, such as polyene/polythiol, and alkoxy oligomers. The binder component 4 may be used alone or in combination.

In particular, when an acryl monomer having a perfluoroalkyl group or a silane coupling agent is used as the binder component 4, the surface of the antifouling composite material 100 becomes water-repellent or oil-repellent and is resistant to triboelectrification. This prevents suspended particulate matter, such as soil dust or pollen, or a liquid substance, such as soy sauce, coffee, or juice, from depositing on the antifouling composite material 100. Hence, an antifouling composite material of much practical use can be provided.

The binder component 4 may be added such that the content of the binder component 4 in the inorganic fine particle layer 10 is at least 0.1% by mass to the content of the inorganic fine particles 2. An increase in the content of the binder component 4 may result in higher strength and higher durability of the inorganic fine particle layer 10. However, when the content of the binder component 4, such as a vinyl monomer having an unsaturated bond, a silane monomer having an unsaturated bond, an acryl monomer having a perfluoroalkyl group, a silane coupling agent having a perfluoroalkyl group, an unsaturated polyester, an unsaturated acryl, an epoxy acrylate, an urethane acrylate, a polyester acrylate, a polyether acrylate, a polybutadiene acrylate, a silicone acrylate, maleimide, or an oligomer such as polyene/polythiol is more than 40% by mass to the content of the inorganic fine particles 2, an increase in the coverage of the inorganic fine particles 2 promotes the electrification of the surface.

The electrification impairs the dustproof property and the detachability of deposited suspended particulate matter, and coagulates the inorganic fine particles 2. The coagulation of the inorganic fine particles 2 causes many defects such as pinholes in the inorganic fine particle layer 10. When the content of the binder component 4 is less than 0.1% by mass to the content of the inorganic fine particles 2, the inorganic fine particle layer cannot be fixed firmly onto the substrate 1, resulting in insufficient durability. Thus, the content of the binder component 4 is preferably in the range of 0.1% by mass to 40% by mass to the content of the inorganic fine particles 2 to improve the durability while the dustproof property and the detachability of motes are maintained.

The present embodiment provides an antifouling composite material containing a water-repellent substance or an oil-repellent substance, such as a fluorinated compound, as at least part of the binder component. The binder component composed of a fluorinated compound is randomly oriented on the surface of the fine particles, thus efficiently exhibiting water repellency or oil repellency at low concentration. Furthermore, the presence of a very small volume of space through which electrons can pass makes triboelectrification difficult, thus preventing the deposition of suspended particulate matter, such as soil dust or pollen, or a liquid substance, such as soy sauce, coffee, or juice. Hence, an antifouling composite material of much practical use can be provided.

According to the present embodiment, the binder component 4 is oriented at any intervals in a self-organized manner on the surface of the inorganic fine particles 2 coated with the silane monomer 3. Thus, the amount of binder component 4 can be reduced. Furthermore, the binder component 4 can efficiently exhibit water repellency or oil repellency. By replacing part of the binder component 4 with a substance having antimicrobial, antivirus, antiallergenic, and/or antithrombotic properties, an antifouling composite material having various functions can be provided without impairing the dustproof property, the detachability of motes, and the antifouling properties, such as water repellency and oil repellency.

A method for chemically combining the substrate 1 with a solution that contains the inorganic fine particles 2 having the silane monomer thereon and the binder component 4 is described below. In the present embodiment, the chemical bond is preferably formed by graft polymerization.

Examples of the graft polymerization in the antifouling composite material 100 according to the present embodiment include graft polymerization in the presence of a peroxide catalyst, graft polymerization utilizing thermal or light energy, and graft polymerization utilizing radiation (radiation graft polymerization).

Among them, radiation graft polymerization is particularly suitable in terms of the simplicity of the polymerization process and the production rate. Examples of radiant rays for use in graft polymerization include alpha rays, beta rays, gamma rays, an electron beam, and ultraviolet rays. Gamma rays, an electron beam, and ultraviolet rays are particularly suitable in the present embodiment.

The antifouling composite material 100 according to the present embodiment is appropriately produced by graft polymerization in the following way.

A first preferred method in the present embodiment is described below. Firstly, the binder component 4 is added to a dispersion solution of the inorganic fine particles 2 chemically bound to the silane monomer 3. After the solution is stirred sufficiently, the solution is applied to an intended surface of the substrate 1 (resin surface). If necessary, a solvent is removed, for example, by heating. The surface of the substrate 1 to which the inorganic fine particles 2 chemically bound to the silane monomer 3 is applied is then irradiated with radiant rays, such as gamma rays, an electron beam, or ultraviolet rays, thus performing both graft polymerization of the silane monomer 3 to the surface of the substrate 1 and bonding between the inorganic fine particles 2, that is, simultaneous radiation graft polymerization.

A second preferred method in the present embodiment is described below. The surface of the substrate 1 is previously irradiated with radiant rays, such as gamma rays, an electron beam, or ultraviolet rays. The binder component 4 is added to a dispersion solution of the inorganic fine particles 2 chemically bound to the silane monomer 3. The sufficiently mixed solution is applied to the surface of the substrate 1 to perform both the reaction between the silane monomer 3 and the substrate 1 and bonding between the inorganic fine particles 2, that is, simultaneous preirradiation graft polymerization.

In the present embodiment, as described above, an antifouling composite material is produced by adding the binder component 4 to a dispersion solution of the inorganic fine particles 2 and then applying the sufficiently mixed solution to the surface of the substrate 1.

The dispersion liquid of the inorganic fine particles 2 may be applied by common spin coating, dip coating, spray coating, cast coating, bar coating, microgravure coating, or gravure coating. The dispersion liquid of the inorganic fine particles 2 may partly be applied by screen printing, pad printing, offset printing, dry offset printing, flexography, ink-jet printing, or any appropriate method.

For efficient and uniform graft polymerization of the silane monomer 3, the surface of the substrate 1 may previously be subjected to hydrophilic treatment, such as corona discharge treatment, plasma discharge treatment, flame treatment, or chemical treatment with an aqueous solution of an oxidizing acid, such as chromic acid or perchloric acid, or an aqueous alkaline solution containing sodium hydroxide.

As described above, the antifouling composite material 100 according to the present embodiment includes the substrate 1 having a resin surface and the inorganic fine particle layer 10 fixed on the substrate 1. The inorganic fine particle layer 10 includes the binder component 4 and the inorganic fine particles 2 coated with the silane monomer 3 having an unsaturated bond. The content of the binder component 4 is in the range of 0.1% by mass to 40% by mass to the content of the inorganic fine particles 2. The binder component 4 is regularly oriented at any intervals on the surface of the fine particles 2 coated with the silane monomer 3. Thus, the antifouling composite material 100 according to the present embodiment can prevent suspended particulate matter, such as soil dust, sand dust, or pollen, or a liquid substance, such as soy sauce, coffee, juice, or salad oil, from depositing thereon. Even when the suspended particulate matter deposits thereon, the antifouling composite material 100 according to the present embodiment exhibits excellent detachability allowing the suspended particulate matter to be removed easily therefrom.

Furthermore, the silane monomer 3 having an unsaturated bond reactive to the substrate 1 is chemically bound to the surface of the inorganic fine particles 2 by a dehydration condensation reaction. The inorganic fine particles 2 are fixed on the substrate 1 by combining unsaturated bonds bound to the surface of the inorganic fine particles 2 together or reacting unsaturated bonds bound to the surface of the inorganic fine particles 2 with the resin surface of the substrate 1. The binder component is also included. Thus, in the antifouling composite material 100 according to the present embodiment, the inorganic fine particles 2 coated with the silane monomer 3 are firmly bound together, and the inorganic fine particles 2 and the substrate 1 are also firmly bound together. The antifouling composite material 100 can therefore exhibit an excellent dustproof effect and an excellent antifouling effect for a long period of time.

Furthermore, according to the present embodiment, by replacing part of the binder component 4, which is oriented on the surface of the inorganic fine particles 2 coated with the silane monomer 3, with a substance having antimicrobial, antivirus, antiallergenic, and/or antithrombotic properties, the antifouling composite material can easily have these functions without impairing the dustproof property, the detachability of motes, and the antifouling properties, such as water repellency and oil repellency.

Furthermore, according to the present embodiment, the inorganic fine particles 2 can firmly be fixed onto the substrate 1 through the chemical bonds 5. Thus, the inorganic fine particles 2 can be fixed onto the substrate 1 after the product form is given by spinning or in the process of production. Hence, the presence of the inorganic fine particles 2 having various functions does not impair the spinning.

Furthermore, the inorganic fine particles 2 can be formed as a particle monolayer or a particle multilayer on a substrate formed of a film, a resin plate, fiber, or cloth. Thus, the inorganic fine particles 2 do not impair the texture of the substrate. Hence, the antifouling composite material according to the present embodiment can find use in a variety of applications.

In the present embodiment, the substrate may have an appropriate form (shape, size, etc.), such as a film, fiber, cloth, mesh, or honeycomb. Thus, these substrates having various forms can have a dustproof function.

The present embodiment can be applied to various products: for example, agricultural materials, such as greenhouse films and tunnel greenhouse films; building materials, such as external wall materials, window frames, doors, and shades; interior materials, such as wallpapers, carpeting, and plastic tiles; footwear, such as clothing, innerwear, hosiery, gloves, and shoes; bedding, such as pajamas, sleeping mats, sheets, pillows, pillowcases, blankets, towel blankets, quilts, and quilt covers; caps and hats; handkerchiefs; towels; carpets; curtains; filters for air cleaners, air conditioners, ventilating fans, vacuum cleaners, and fans; electrodes and separators for fuel-cells; mosquito nets; screen printing meshes; and components in which biological fouling tends to occur, such as ships, coastal structures, fish preserves, fishnets, buoys, water intake openings, an water treatment filters. The dustproof and antifouling composite material according to the present embodiment is useful in providing various excellent products in a variety of applications.

EXAMPLES

The present invention will specifically be described with reference to the following Examples. However, the present invention is not limited to these Examples.

Fine particle composite materials according to Examples 1 to 8 were produced by electron beam graft polymerization with an electrocurtain electron beam irradiation apparatus CB250/15/180L manufactured by Iwasaki Electric Co., Ltd.

Example 1

Ten percent by mass of inorganic fine particles, commercially available titanium dioxide particles (Ishihara Sangyo Kaisha, Ltd., TTO-S-1), were dispersed in methanol. The pH of the dispersion solution was adjusted to 4.0 with hydrochloric acid. The titanium dioxide particles were pulverized in a bead mill. The pulverized particles had an average particle size of 15 nm. A silane monomer having an unsaturated bond, 3-methacryloxypropyltrimethoxysilane (Shin-Etsu Chemical Co., Ltd., KBM-503), in amounts of 3.0% by mass to the inorganic fine particles was added to the resulting dispersion solution.

The dispersion solution was transferred into a flask equipped with a condenser tube and was heated under reflux in an oil bath for four hours. The silane monomer was chemically bound to the titanium dioxide fine particles by a dehydration condensation reaction. A binder component 4, (1) tetramethoxysilane (Shin-Etsu Chemical Co., Ltd., KBM-04), (2) hydroxyethyl acrylate (Kyoeisha Chemical Co., Ltd.), (3) pentaerythritol triacrylate (Kyoeisha Chemical Co., Ltd.), or (4) a binder containing silicone acrylate (GE Toshiba Silicones Co., Ltd., UVHC8558), in amounts of 15% by mass to the silane monomer-coated inorganic fine particles was added to the dispersion solution. The titanium dioxide particles was redispersed in a bead mill. The average particle size of the titanium dioxide fine particles in the dispersion solution was 14 nm. The term "average particle size" used herein refers to a volume-average particle size.

The dispersion solution further containing a binder component was applied to 125 μm polyester film (Toray Industries, Inc., Lumirror) with a bar coater and was dried at 110° C. for one minute. The polyester film to which the dispersion liquid containing the titanium dioxide fine particles was applied was irradiated with 5 Mrad of electron beam at an accelerating voltage of 200 kV. The titanium dioxide fine particles were bound to the polyester film by the graft polymerization of the silane monomer, thus producing a dustproof composite material.

Example 2

Example 2 is the same as Example 1 except that a water repellent substance, (1) stearyl acrylate (Kyoeisha Chemical Co., Ltd.) as an acryl monomer or (2) silicone oligomer (Matsushita Electric Industrial Co., Ltd., Frescera D), in amounts of 15% by mass to the silane monomer-coated inorganic fine particles was added as the binder component in the dispersion solution.

Example 3

Inorganic fine particles, commercially available titanium dioxide fine particles (Tayca Corporation, MT-100HD), in amounts of 10.0% by mass of methanol and a silane monomer, 3-methacryloxypropyltrimethoxysilane (Shin-Etsu Chemical Co., Ltd., KBM-503), in amounts of 3.0% by mass to the fine particles was added. The pH of the resulting mixture was adjusted to 3.0 with hydrochloric acid. The titanium dioxide fine particles were pulverized in a bead mill. The pulverized particles had an average particle size of 18 nm. The dispersion solution was subjected to solid-liquid separation in a lyophilizer and was heated at 120° C. to chemically combine the silane monomer with the titanium dioxide fine particles by a dehydration condensation reaction. Ten percent by mass of the resulting surface-treated titanium dioxide fine particles were added to methanol. A binder component, an oligomer having a perfluoroalkyl group and a silanol group (Shin-Etsu Chemical Co., Ltd., KP-801M), in amounts of (1) 1% by mass, (2) 5% by mass, or (3) 10% by mass to the silane monomer-coated inorganic fine particles was added to the methanol. Other procedures were the same as in Example 1.

Example 4

Example 4 is the same as Example 1 except that an inorganic fine particle layer was formed on an 80-mesh polyester used in place of the polyester film substrate.

Example 5

Example 5 is the same as Example 3 except that an inorganic fine particle layer was formed on an 80-mesh polyester used in place of the polyester film substrate.

Example 6

Example 6 is the same as Example 3 except that an inorganic fine particle layer was formed on a polyester nonwoven fabric having a mass per unit area of 70 g/m² (Asahi Kasei Corporation, Eltas E01070) used in place of the polyester film substrate.

Example 7

Example 6 is the same as Example 3 except that (1) 0.1% by mass or (2) 40% by mass of binder component is added to the dispersion solution.

Example 8

Example 8 is the same as Example 7 except that the polyester film was not irradiated with an electron beam, that is, a process of combining the titanium dioxide fine particles with the polyester film by graft polymerization of the silane monomer was omitted.

Comparative Example 1

Comparative Example 1 is the same as Example 3 except that (1) no or (2) 0.05% by mass of binder component was added to the dispersion solution.

Comparative Example 2

Comparative Example 2 is the same as Example 3 except that 50% by mass of binder component, pentaerythritol triacrylate (Kyoeisha Chemical Co., Ltd.), was added to the dispersion solution and that an 80-mesh polyester was used in place of the polyester film substrate.

Comparative Example 3

The properties of an untreated 80-mesh polyester were evaluated.

Comparative Example 4

A commercially available water and oil repellent (Sumitomo 3M Ltd., SCOTCHGARD) was sprayed onto the 80-mesh polyester used in Example 5. After the 80-mesh polyester was placed at room temperature for two hours, the properties of the polyester were evaluated.

Comparative Example 5

The properties of a commercially available fluorinated nonwoven fabric having a mass per unit area of 70 g/m² (Nitto Denko Corporation, NTF9307) were evaluated without any treatment.

Table 1 summarizes the conditions of Examples 1 to 8 and Comparative Examples 1 to 3. The binder content is expressed in % by mass.

TABLE 1

| | | Inorganic fine particle layer | | | |
| --- | --- | --- | --- | --- | --- |
| | Substrate | Inorganic fine particle | Binder | Binder content | Chemical bond |
| Example 1 (1) | PET film | Titanium dioxide | Tetramethoxysilane | 15 | Graft polymerization |
| (2) | " | Titanium dioxide | Hydroxyethyl acrylate | " | Graft polymerization |
| (3) | " | Titanium dioxide | Pentaerythritol triacrylate | " | Graft polymerization |
| (4) | " | Titanium dioxide | Silicone acrylate | " | Graft polymerization |
| Example 2 (1) | " | Titanium dioxide | Stearyl acrylate | " | Graft polymerization |
| (2) | " | Titanium dioxide | Silicone oligomer | " | Graft polymerization |
| Example 3 (1) | " | Titanium dioxide | Oligomer having perfluoroalkyl and silanol groups | 1 | Graft polymerization |
| (2) | " | Titanium dioxide | Oligomer having perfluoroalkyl and silanol groups | 5 | Graft polymerization |
| (3) | " | Titanium dioxide | Oligomer having perfluoroalkyl and silanol groups | 10 | Graft polymerization |

TABLE 1-continued

| | Substrate | Inorganic fine particle layer | | | |
|---|---|---|---|---|---|
| | | Inorganic fine particle | Binder | Binder content | Chemical bond |
| Example 4 (1) | PET mesh | Titanium dioxide | Tetramethoxysilane | 15 | Graft polymerization |
| (2) | " | Titanium dioxide | Hydroxyethyl acrylate | " | Graft polymerization |
| (3) | " | Titanium dioxide | Pentaerythritol triacrylate | " | Graft polymerization |
| (4) | " | Titanium dioxide | Silicone acrylate | 15 | Graft polymerization |
| Example 5 (1) | " | Titanium dioxide | Oligomer having perfluoroalkyl and silanol groups | 1 | Graft polymerization |
| (2) | " | Titanium dioxide | Oligomer having perfluoroalkyl and silanol groups | 5 | Graft polymerization |
| (3) | " | Titanium dioxide | Oligomer having perfluoroalkyl and silanol groups | 10 | Graft polymerization |
| Example 6 (1) | Nonwoven fabric | Titanium dioxide | Oligomer having perfluoroalkyl and silanol groups | 1 | Graft polymerization |
| (2) | Nonwoven fabric | Titanium dioxide | Oligomer having perfluoroalkyl and silanol groups | 5 | Graft polymerization |
| (3) | Nonwoven fabric | Titanium dioxide | Oligomer having perfluoroalkyl and silanol groups | 10 | Graft polymerization |
| Example 7 (1) | PET film | Titanium dioxide | Oligomer having perfluoroalkyl and silanol groups | 0.1 | Graft polymerization |
| (2) | " | Titanium dioxide | Oligomer having perfluoroalkyl and silanol groups | 40 | Graft polymerization |
| Example 8 (1) | " | Titanium dioxide | Oligomer having perfluoroalkyl and silanol groups | 0.1 | None |
| (2) | " | Titanium dioxide | Oligomer having perfluoroalkyl and silanol groups | 40 | None |
| Comparative Example 1 (1) | " | Titanium dioxide | None | None | Graft polymerization |
| (2) | " | Titanium dioxide | Oligomer having perfluoroalkyl and silanol groups | 0.05 | Graft polymerization |
| Comparative Example 2 | PET mesh | Titanium dioxide | Oligomer having perfluoroalkyl and silanol groups | 50 | Graft polymerization |
| Comparative Example 3 | " | None | None | None | None |
| Comparative Example 4 | " | None | None | None | None |
| Comparative Example 5 | Nonwoven fabric | None | None | None | None |

(Evaluation of Properties)

Dustproof property: A sample was cut into a 10 cm×10 cm test piece. KANTO loam, quartz sand, or mixed dust each in conformity with JIS Z 8901 was evenly sprinkled over the piece. The mass of the test piece was measured before and after the deposition of dust.

Wettability: Surface wettability is a measure of an antifouling property. Two microliters of distilled water was dropped onto a composite material. The contact angle of the droplet was measured with a solid-liquid interface analyzer Drop-Master 300 manufactured by Kyowa Interface Science Co., Ltd. In general, a larger contact angle is indicative of a higher "antifouling property" against the liquid (repel the liquid or resist liquid stain).

Electrostatic potential generated by friction: A test piece (10 cm×10 cm) was electrically charged by the friction with a feather duster. The electrostatic potential was measured with a static electricity meter (SV-73A) manufactured by Nippon Static Co., Ltd.

Durability of dustproof property: A test piece was washed by moving a commercial sponge back and forth 10 times under a load of 100 g. A change in dustproof property was determined as a measure of durability. For Comparative Examples 2, 3, 4, and 5, the durability test was not performed, because their initial dustproof properties were poor.

TABLE 2

| | | Dustproof property (mg/dm$^2$) | Contact angle (°) | Electrostatic potential generated by friction (kV) | Durability (mg/dm$^2$) |
|---|---|---|---|---|---|
| Example 1 | (1) | 0 | 17.9 | −0.4 | 0 |
| | (2) | 0 | 16.3 | −0.1 | 0 |
| | (3) | 1 | 36.2 | −0.6 | 0 |
| | (4) | 0 | 37.6 | −0.7 | 1 |
| Example 2 | (1) | 1 | 106.8 | −0.6 | 0 |
| | (2) | 0 | 100.9 | −0.8 | 0 |
| Example 3 | (1) | 0 | 95.1 | −0.1 | 0 |
| | (2) | 0 | 126.4 | −0.3 | 1 |
| | (3) | 0 | 132.1 | −1.0 | 0 |
| Example 4 | (1) | 0 | 80> | −0.1 | 0 |
| | (2) | 1 | 80> | −0.1 | 0 |
| | (3) | 1 | 80> | −0.5 | 1 |
| | (4) | 1 | 80> | −0.5 | 1 |
| Example 5 | (1) | 0 | 105.3 | −0.1 | 0 |
| | (2) | 0 | 123.8 | −0.4 | 1 |
| | (3) | 1 | 132.2 | −0.8 | 0 |
| Example 6 | (1) | 2 | 129.0 | −0.1 | 1 |
| | (2) | 4 | 136.3 | −0.1 | 3 |
| | (3) | 3 | 141.7 | −0.3 | 3 |
| Example 7 | (1) | 0 | 78.3 | −0.1 | 1 |
| | (2) | 0 | 138.6 | −1.5 | 0 |
| Example 8 | (1) | 0 | 75.4 | −0.2 | 4 |
| | (2) | 0 | 133.5 | −1.7 | 5 |
| Comparative Example 1 | (1) | 0 | 17.7 | −0.2 | 4 |
| | (2) | 0 | 36.7 | −0.3 | 2 |
| Comparative Example 2 | | 18 | 80> | −6.0 | — |
| Comparative Example 3 | | 58 | 80> | −6.0 | — |
| Comparative Example 4 | | 38 | 130.4 | −4.0 | — |
| Comparative Example 5 | | 113 | 131.2 | −5.0 | — |

"80>" in Table 2 means the contact angle is approximately less than 80°.

Table 2 shows that in Example 1, which contained the binder component 4, the mass of mixed dust deposited on the test piece was almost unchanged in the durability test, indicating that the dustproof property was maintained. In Comparative Example 1, a large difference in the mass of mixed dust deposited on the test piece was observed, indicating deterioration in dustproof property. The results demonstrated that the durability was improved by the addition of the binder component 4.

In Comparative Example 2, in which 50% by mass of binder component 4 was included, neither the dustproof property nor the detachability of motes was exhibited because of triboelectrification. Examples 1 to 8, in which the content of the binder component 4 was in the range of 0.1% by mass to 40% by mass, had the dustproof property. The results show that when the content of the binder component 4 is in the range of 0.1% by mass to 40% by mass to the inorganic fine particles 2, the antifouling composite material 100 can have an excellent dustproof property, excellent detachability of motes, and sufficient durability for practical applications.

Examples 2, 3, 5, 6, 7, and 8 include a water-repellent substance or an oil-repellent substance as the binder component 4. These Examples show that even when the content of the binder component 4 is as low as about 15%, the test piece has a water contact angle of 100° or more and thus exhibit high water repellency, suggesting that the test piece has an antifouling property preventing a liquid substance, such as juice or soy sauce, from depositing thereon. Furthermore, friction did not cause charges, indicating that the test piece had a dustproof property.

In contrast, PET nonwoven fabric of Comparative Example 4 and PTFE nonwoven fabric of Comparative Example 5 were water-repellent, but were electrically charged by friction. Furthermore, they did not have the dustproof property.

Furthermore, in Examples 2, 3, 5, 6, and 7, a change in the mass of mixed dust deposited on the test piece, which was a measure of durability, differed little from the initial property (dustproof property). Thus, use of a water-repellent substance or an oil-repellent substance in the binder component 4 can provide a highly durable antifouling composite material. Even when suspended particulate matter or a liquid substance deposits on the antifouling composite material, the suspended particulate matter or the liquid substance is easily removable therefrom.

Furthermore, difference in durability between Example 7 and Example 8 demonstrated that fixation of inorganic fine particles by graft polymerization improves the durability.

As shown by the results on durability in Examples, because the binder component 4 has an unsaturated group, such as a vinyl group, an epoxy group, a styryl group, a methacryl group, an acryloxy group, or an isocyanate group, or an alkoxy group as a reactive site that can be chemically bound to the reactive group of the silane monomer 3 disposed on the inorganic fine particles 2, the composite material has an excellent dustproof property, excellent detachability of motes, and sufficient durability for practical applications.

Figure 2A:
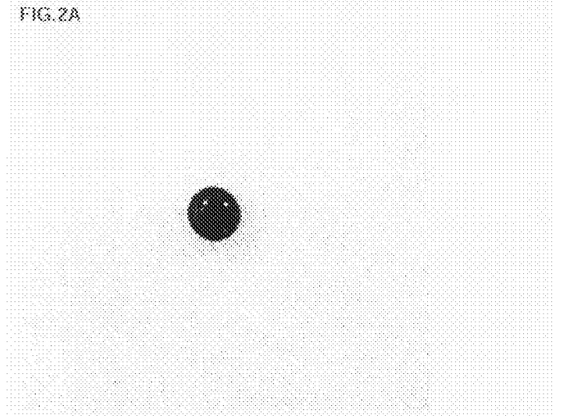
FIG. 2A is one of comparative photographs of antifouling clothing according to an embodiment of the present invention and untreated clothing, and shows a photograph of the antifouling clothing.
Figure 2B:
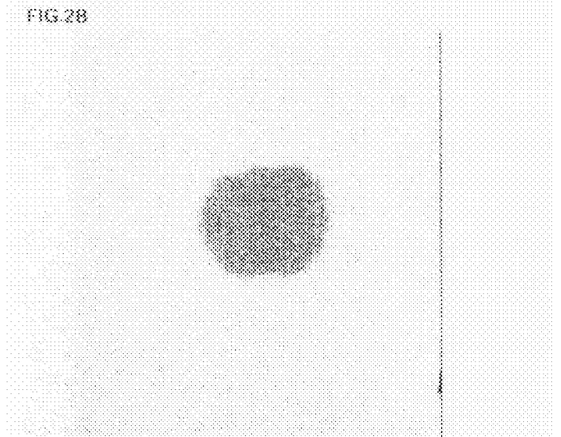
FIG. 2B is one of comparative photographs of antifouling clothing according to an embodiment of the present invention and untreated clothing, and shows a photograph of the untreated clothing.

A cloth of 65% polyester and 35% cotton blend, which is generally used in clothing or aprons, was used as an example of a commercial product. Soy sauce was dropped on a cloth treated as in Example 3 (2), as illustrated in FIG. 2A. The droplet spread immediately on an untreated cloth (FIG. 2B) and left a stain. In contrast, the droplet maintained its shape on the treated cloth (FIG. 2A) and left almost no stain when the droplet was removed immediately.

Figure 3A:
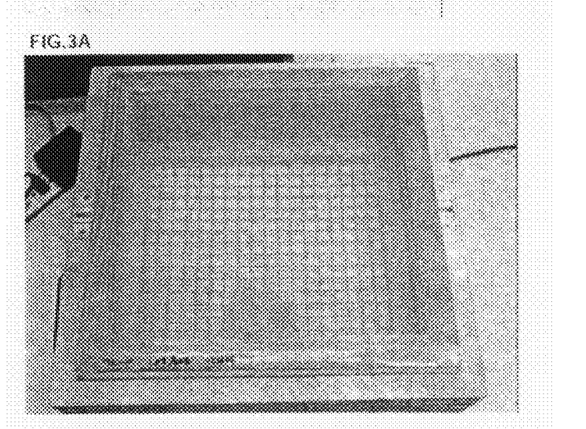
FIG. 3A is one of comparative photographs of an antifouling filter according to an embodiment of the present invention and an untreated filter, and shows a photograph of the antifouling filter.
Figure 3B:
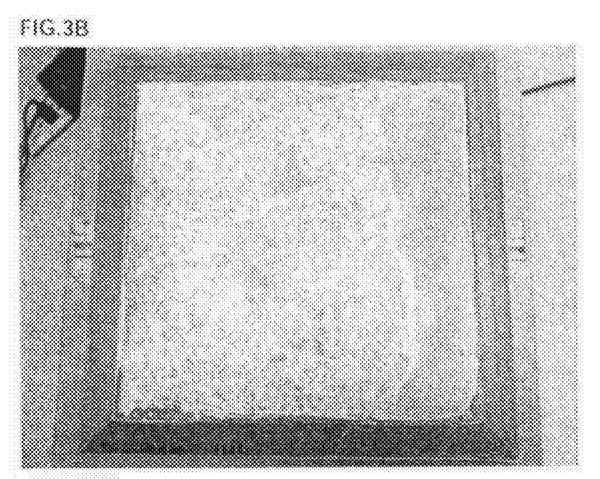
FIG. 3B is one of comparative photographs of an antifouling filter according to an embodiment of the present invention and an untreated filter, and shows a photograph of the untreated filter.

As one of commercial filter products, a sieve for use in flour milling was treated according to the present invention. Wheat flour was sifted through the sieve, as illustrated in FIG. 3A. A mesh woven from 62 μm nylon 66 warp yarn and 80 μm nylon 66 weft yarn (NBC Inc., NXX7) was treated as in Example 4 (1). The mesh was attached to a square frame having inside dimensions of 200 mm×200 mm to make a sieve. The sieve was mounted in a vibrating screen machine. After 600 g of wheat flour was sifted, the sieve was removed and was tapped to remove wheat flour left on the sieve (FIG. 3A). For a sieve including an untreated mesh, after 500 g of wheat flour was sifted, little wheat flour could pass the sieve. After the sieve was tapped, almost the front of the openings were blocked by wheat flour (FIG. 3B).

Figure 4A:
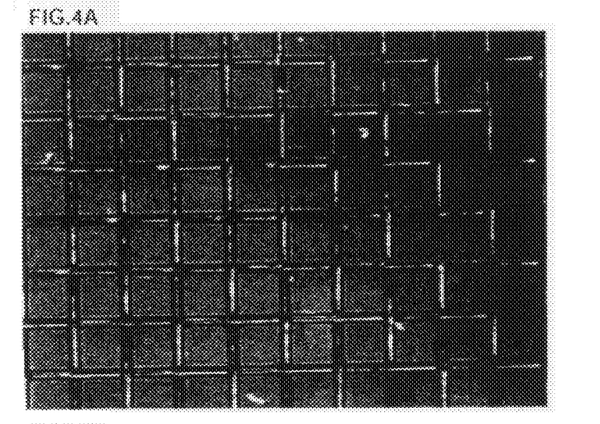
FIG. 4A is one of comparative photographs of an antifouling mosquito net according to an embodiment of the present invention and an untreated mosquito net, and shows a photograph of the antifouling mosquito net.
Figure 4B:
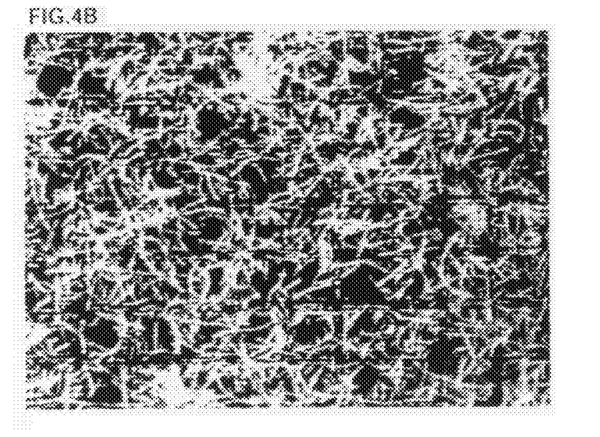
FIG. 4B is one of comparative photographs of an antifouling mosquito net according to an embodiment of the present invention and an untreated mosquito net, and shows a photograph of the untreated mosquito net.

A 50 mesh mosquito net weaved from 100 μm polyester fibers was treated as in Example 4 (4). Cotton linters were sprinkled over the mosquito net, as illustrated in FIG. 4A. After cotton linters were sprinkled over the horizontally placed mosquito net, the mosquito net was stood vertically and was tapped to remove cotton linters (FIG. 4A). For the untreated mosquito net, cotton linters were difficult to remove and remained caught in the net (FIG. 4B).

Figure 5A:
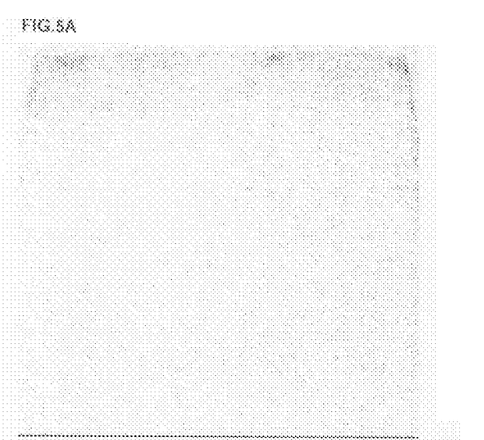
FIG. 5A is one of comparative photographs of an antifouling building material according to an embodiment of the present invention and an untreated building material, and shows a photograph of the antifouling building material.
Figure 5B:
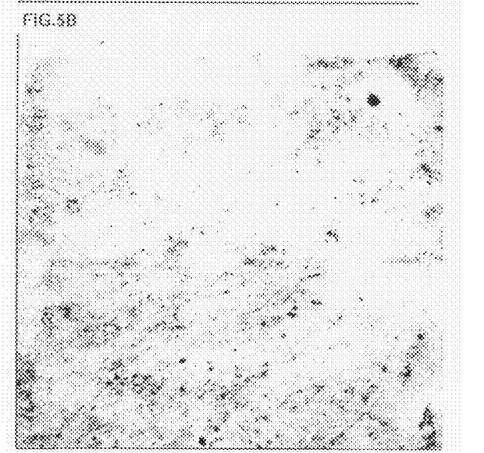
FIG. 5B is one of comparative photographs of an antifouling building material according to an embodiment of the present invention and an untreated building material, and shows a photograph of the untreated building material.

Building materials, such as metals, wood, ceramics, and resins, can be used as a single item. The surfaces of building materials are often painted, coated with a resin, or overlaid with a laminate such as a resin film. As an example of a building material, a fluorocarbon resin film having a thickness of 50 μm (Asahi Glass Co., Ltd., ETFE film, Aflex 50N) was treated as in Example 1 (3). Mixed dust was sprinkled over the film, as illustrated in FIG. 5A. After mixed dust conforming to JIS Z 8901 was sprinkled over the horizontally placed ETFE film, the ETFE film was stood vertically and was tapped to remove mixed dust (FIG. 5A). For an untreated ETFE film, mixed dust was difficult to remove and was left on the ETFE film (FIG. 5B).

Figure 6A:
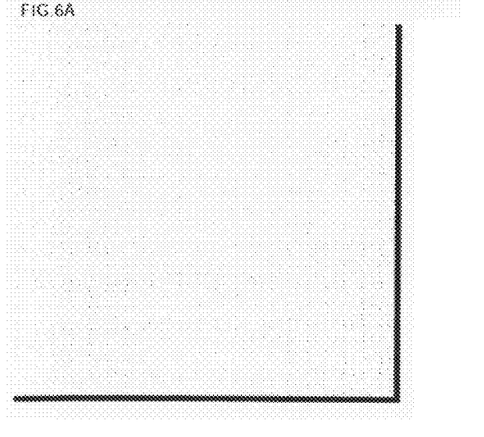
FIG. 6A is one of comparative photographs of an antifouling interior material according to an embodiment of the present invention and an untreated interior material, and shows a photograph of the antifouling interior material.
Figure 6B:
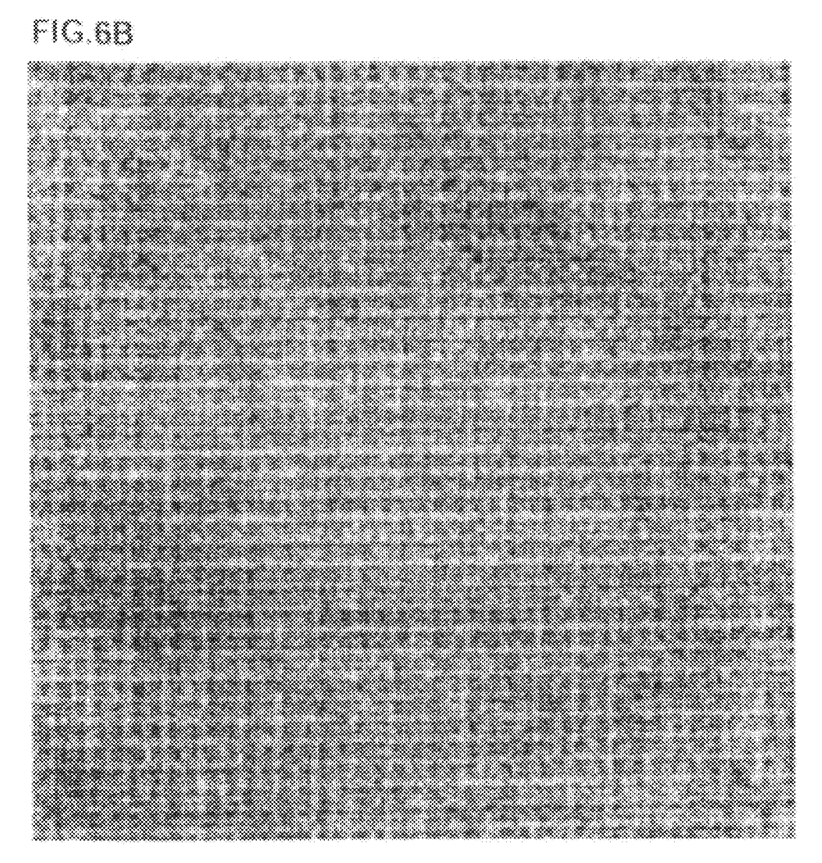
FIG. 6B is one of comparative photographs of an antifouling interior material according to an embodiment of the present invention and an untreated interior material, and shows a photograph of the untreated interior material.

As an example of an interior material, a commercial polyester curtain fabric was treated as in Example 1 (3). Mixed dust was sprinkled over the curtain fabric, as illustrated in FIG. 6A. After mixed dust conforming to JIS Z 8901 was sprinkled over the horizontally placed curtain fabric, the curtain fabric was picked up and was tapped to remove mixed dust (FIG. 6A). For an untreated curtain fabric, mixed dust was difficult to remove and was left on the curtain fabric (FIG. 6B).

Embodiments of the present invention are not limited to the product examples described above. For example, the substrate may have an appropriate form (shape, size, etc.), such as a film, fiber, cloth, mesh, or honeycomb. Products that include these substrates of various forms having a dustproof function are contemplated.

The invention claimed is:

1. An antifouling composite material comprising:
a substrate; and
an inorganic fine particle layer disposed on a surface of the substrate, the inorganic fine particle layer comprising inorganic fine particles coated with a silane monomer and having an average particle size of 300 nm or less and a binder component, which enters gaps between the silane monomer-coated inorganic fine particles and combines the silane monomer that does not participate in bonding between the fine particles,
wherein the content of the binder component in the inorganic fine particle layer is in the range of 0.1% by mass to 40% by mass to the content of the inorganic fine particles coated with the silane monomer,
wherein the silane monomer comprises unsaturated bonds disposed on the inorganic fine particles in the inorganic fine particle layer, wherein the unsaturated bonds face outward from the surface of the inorganic fine particles and form chemical bonds, thereby forming the inorganic fine particle layer,
wherein the unsaturated bonds of the silane monomer disposed on the inorganic fine particles in the inorganic fine particle layer are bound to the surface of the substrate through the chemical bonds, thereby disposing the inorganic fine particle layer onto the substrate, and
wherein the binder component comprises a fluorinated compound, and is oriented in gaps between the silane monomer-coated inorganic fine particles and is oriented on the surface of the inorganic fine particle layer at any interval.

2. The antifouling composite material according to claim 1, wherein the binder component further comprises a water-repellent compound or an oil-repellent compound.

3. The antifouling composite material according to claim 1, wherein the chemical bonds are formed by graft polymerization.

4. The antifouling composite material according to claim 3, wherein the graft polymerization is radiation graft polymerization.

5. The antifouling composite material according to claim 1, wherein at least the surface of the substrate is formed of a resin.

6. A building material formed of the antifouling composite material according to claim 5.

7. The antifouling composite material according to claim 1, wherein the substrate is formed of a resin.

8. An article of clothing formed of the antifouling composite material according to claim 7.

9. A filter formed of the antifouling composite material according to claim 7.

10. A mosquito net formed of the antifouling composite material according to claim 7.

11. An interior material formed of the antifouling composite material according to claim 7.

12. The antifouling composite material according to claim 1, wherein the substrate has a fibrous structure.

13. The antifouling composite material according to claim 1, wherein the binder component binds silane monomers of adjacent inorganic fine particles.

14. The antifouling composite material according to claim 1, wherein the silane monomers bind to silane monomers of adjacent inorganic fine particles.

15. The antifouling composite material according to claim 1, wherein the fluorinated compound is a water-repellent compound or an oil-repellent compound.

* * * * *